United States Patent [19]

Mitchell

[11] 4,249,472
[45] Feb. 10, 1981

[54] THERMAL REACTORS

[76] Inventor: Douglas A. Mitchell, 7 Clifton Gardens, Eaglescliffe, Stockton-on-Tees, Cleveland, England

[21] Appl. No.: 957,727

[22] Filed: Nov. 6, 1978

Related U.S. Application Data

[63] Continuation of Ser. No. 775,206, Mar. 7, 1977, abandoned.

[30] Foreign Application Priority Data

Mar. 12, 1976 [GB] United Kingdom ................ 9972/76

[51] Int. Cl.³ .......................... F23G 5/00; F23G 7/00; F22B 1/02
[52] U.S. Cl. .................................... 110/245; 122/4 D
[58] Field of Search ............... 110/245, 263; 122/4 D; 431/7, 170; 432/158; 60/39.12; 422/139, 141; 201/31

[56] References Cited

U.S. PATENT DOCUMENTS

| | | | |
|---|---|---|---|
| 1,969,501 | 8/1934 | Chapman | 110/263 |
| 2,649,358 | 8/1953 | Palmer | 422/139 X |
| 2,700,644 | 1/1955 | Leffer | 201/31 X |
| 3,119,379 | 1/1964 | Sweeney | 110/263 X |
| 3,194,215 | 7/1965 | Barnes | 431/170 X |
| 3,236,607 | 2/1966 | Porter, Jr. et al. | 422/141 |
| 3,636,896 | 1/1972 | McLaren et al. | 110/245 X |
| 3,754,993 | 8/1973 | Oguchi et al. | 422/141 |
| 3,893,426 | 7/1975 | Bryers | 110/245 X |
| 3,921,590 | 11/1975 | Mitchell et al. | 110/245 X |

Primary Examiner—Leonard E. Smith

[57] ABSTRACT

A thermal reactor, for example an incinerator, in which an upstanding partition wall in a furnace vessel defines adjacent, interconnecting compartments each containing a bed of particulate material, said beds being fluidized to different extent whereby a cascade of particulate bed material flows across the of the wall from the more fluidized bed to the less fluidized bed and circulation of said bed material around the partition wall is established.

14 Claims, 5 Drawing Figures

THERMAL REACTORS

This application is a continuation of U.S. application Ser. No. 775,206, filed Mar. 7, 1977, now abandoned.

This invention relates to thermal reactors, and more particularly to such reactors incorporating fluidised beds.

It is known to provide, for example, incinerators which are capable of burning the combustible content of waste material such as town refuse and commerical, agricultural and industrial waste.

However, such waste material often contains some non-combustible matter which must be removed periodically from the incinerator. Additionally some matter in the waste material may melt and fuse into solid, non-combustible products in the incinerator, and these also have to be removed periodically from the incinerator along with the ash resultant from the combustion.

The provision of fluidised bed incinerators enables combustion to be achieved within the bed while the non-combustible products migrate through the bed to suitable take-off points both above the bed (for fly ash) and below the bed (for de-fluidised ash).

Heretofore, the required circulation of the fluidised bed in such incinerators has been achieved by providing air boxes below the bed which supply air under pressure into the bed material. However it has been necessary to provide at least two, but more often three, separate primary air distribution means, as well as a supply of secondary air, to obtain adequate circulation of the bed and successful operation of the incinerator. Further the design and construction of existing circulating fluidised bed incinerators are such that the depth of the bed is limited to about 400 to 700 mm, with the result that, amongst other things, the residence time of the waste material in the bed is accordingly limited.

In the following description, the term 'fluidised bed' and allied phrases are to be understood as covering a bed in which particulate matter is generally in random motion and is separated by a flowing fluid medium. Thus the term includes within its scope beds in which spouting or pneumatic transport is occurring.

Further, the term 'thermal reactor' is to be understood as covering a vessel in which a reaction such as incineration, combustion, partial oxidation, gasification, pyrolysis, calcining or catalysis is taking place.

According to the present invention there is provided a thermal reactor comprising a furnace vessel having a partition wall located therein to define within the vessel first and second compartments, said compartments being in communication with each other at or adjacent both the upper and lower regions of the partition wall, a mass of particulate material forming a first bed in the first compartment, a further mass of particulate material forming a second bed in the second compartment, means for fluidising the upper regions of the second bed to a greater extent than the upper regions of the first bed, diverter means above the second compartment for diverting, in use of the reactor, a cascade of particulate material from the second bed across the top of the first bed, at least one inlet from the exterior of the vessel for supplying material to be reacted to said vessel, at least one outlet from the base of the second compartment for discharging non-combustible products and/or bed material, and a flue outlet from the vessel.

When solid material is to be reacted in the vessel, the or each inlet feeds into the first compartment. When a liquid or gas is to be reacted, the or each inlet feeds into the lower regions of the second compartment.

In use of such a reactor as, for example, an incinerator, solid waste material including combustible and non-combustible material is introduced into the first compartment through the or each inlet. Said material is largely enveloped by the first bed and is partially burned or combusted. Initially some fuel is introduced into the first compartment to start the combustion, the bed of particulate material, conveniently in this case refractory material, soon becoming sufficiently hot to maintain said combustion. Because the bed material in the upper regions of the second compartment is fluidised to a greater extent than that in the upper regions of the first compartment, bed material spills from the second compartment and is diverted as a cascade across the top of the first compartment by the diverter means. Bed material from the first compartment then migrates beneath the partition wall from the first compartment to the second compartment taking with it the non-combustible materials and/or solid combustible products of partial combustion which have collected at the base of the first compartment. The solid combustible products are finally burned out in the second compartment while the non-combustible materials are periodically removed from the vessel through the or each outlet at the base of the second compartment.

Reactors according to the invention eliminate the necessity for secondary air to ensure adequate circulation, the cascade from one compartment to the other being readily set up, and the partition wall defining a positive path for the circulation. Further, the depth of the beds can be increased well beyond those permissible in established equipment thus enabling residence times within said beds to be increased accordingly.

Perferably the partition wall defines within the vessel first and second compartments each of uniform cross-sectional area throughout their height, separate fluidising means being provided for each compartment, said means being arranged to fluidise the second bed to a greater extent than the first bed.

In an alternative reactor, the partition wall defines first and second compartments the cross-sectional areas of which increase and decrease respectively from the lower regions to the upper regions thereof, a common fluidising means being provided for both compartments.

The diverter means may comprise a plate member securely mounted within the vessel to to extend across the top of the second compartment, said plate preferably being angled upwardly in a direction from the compartment towards the first compartment.

In a preferred reactor, the partition wall defines within the vessel first and second compartment one surrounding the other.

In one embodiment of such a preferred reactor, the first compartment surrounds the second compartment, the diverter means comprising an inverted conical member positioned centrally over the second compartment, the gap between the top of the partition wall and said diverter means determining the thickness of the cascade from the second bed across the top of the first bed.

Conveniently the vessel and partition wall are cylindrical to define within the vessel a central cylindrical compartment and a surrounding annular compartment.

By way of examples only, embodiments of the invention will now be described in greater detail with reference to the accompanying diagrammatical drawings of which:

Figure 1:
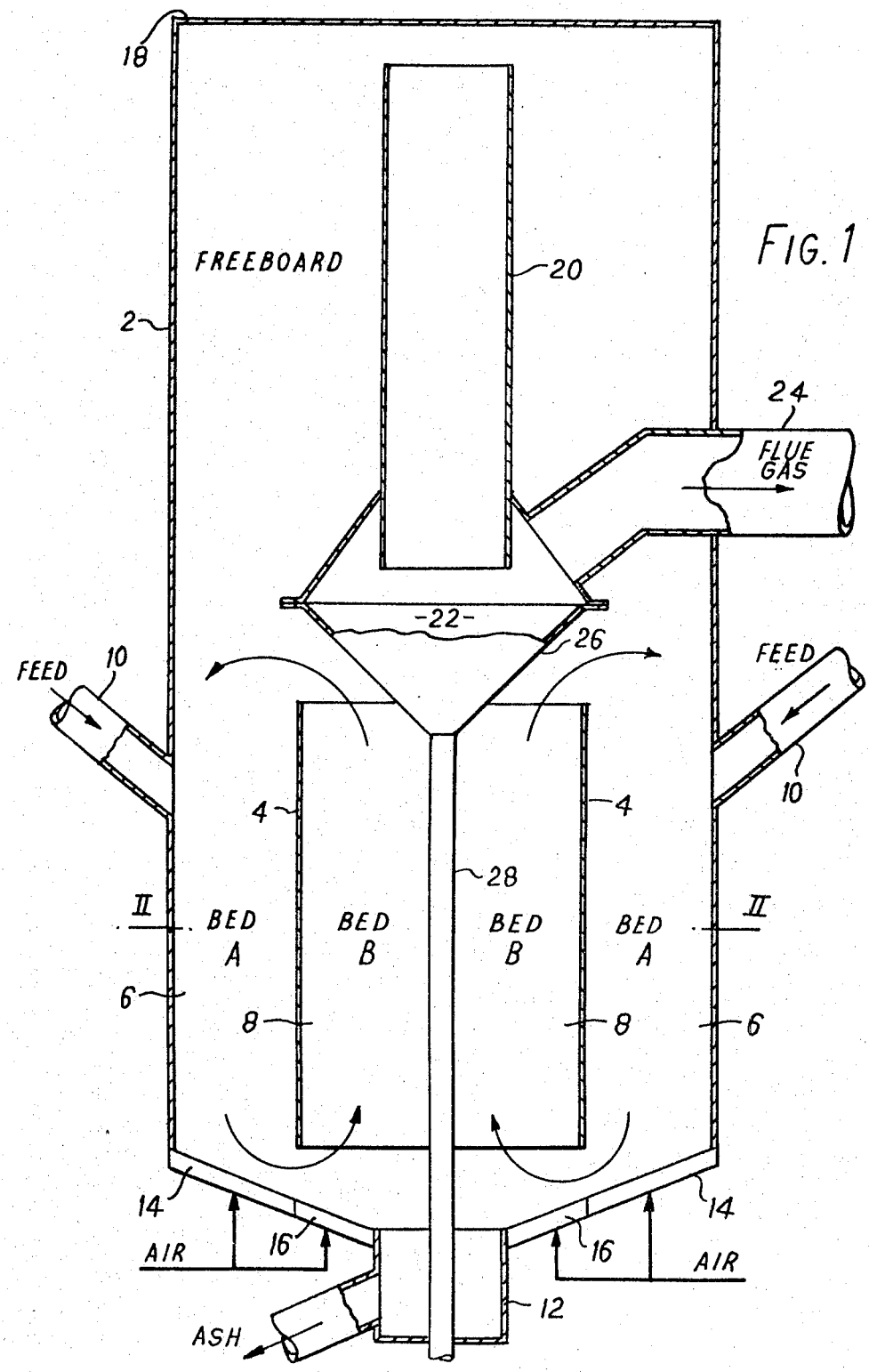
FIG. 1 is a central vertical section through an incinerator according to the invention.
Figure 2:
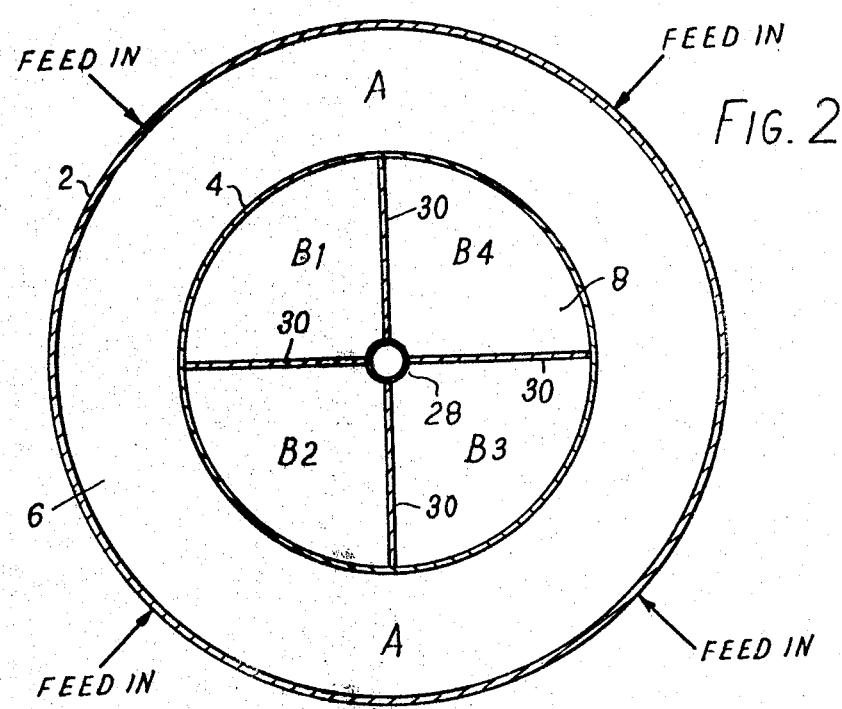
FIG. 2 is a section on the line II—II of FIG. 1.

Referring to FIGS. 1 and 2 there is illustrated a fluidised bed incinerator comprising a cylindrical furnace vessel 2 arranged vertically and having a cylindrical partition wall 4 coaxially disposed within its lower region. The vessel and partition wall together define an annular first compartment 6 surrounding a cylindrical second compartment 8.

Positioned around the vessel 2 are four uniformly spaced inlet ports 10 through which material can be fed into the compartment 6. The base of the vessel is inclined downwardly towards the longitudinal central axis of the vessel, a cylindrical tube 12 forming an outlet from the second compartment 8.

The base of the vessel includes a first air-box 14 positioned below the compartment 6 and a second, separate air-box 16 positioned below the compartment 8, while the lower end of the partition wall is spaced from the base of the vessel whereby said compartments 6 and 8 are in communication with each other below said wall.

Each compartment 6 and 8 contains a mass of particulate refractory material defining beds A and B respectively, said material typically being coarsely graded and/or ash and/or char of between 1 and 10 mm diameter.

The upper end of the vessel 2 is closed by a top wall 18, a downwardly extending pipe, or downcomer, 20 being disposed within the upper regions of said vessel with its upper end just below said wall 18. The lower end of the pipe 20 projects into a chamber, or separator, 22 positioned centrally above the chamber 8, an outlet duct 24 extending from said chamber 22 to the exterior of the vessel.

The bottom wall 26 of the chamber 22 is of substantially inverted conical shape to provide a diverter means as will be detailed below. A tube 28 communicates with the interior of the chamber 22 and extends from the lowest region of the bottom wall 26 axially down through the centre of the compartment 8 and through the tube 12 to the exterior of the vessel. Alternatively, said tube 28 may terminate within, near the bottom of, compartment 8.

In use of the incinerator, air under pressure from the boxes 14 and 16 is supplied to the bed material in the compartments 6 and 8 such that both ends A and B are fluidised, bed B to a greater extent than bed A. For example fluidisation of bed A may be of the order of 1 to 4 Gmf and that of bed B of the order ot 4 to 40 Gmf depending upon combustion requirements, where Gmf is an indication of the mass flow of the fluidising air or gaseous medium at minimum fludisiation of a bed—i.e. just past the incipient condition.

Waste material or refuse, comprising both combustible and non-combustible matter, is fed through the inlet ports 10 into, to be enveloped by, the particulate material of bed A. Initially fuel is also supplied to bed A to instigate combustion which rapidly becomes seld-sustaining as will be explained below. The combustible matter is thus at least partially consumed in bed A.

The fluidisation of bed B is such that particulate refractory material therefrom is forced upwardly, or pneumatically transported, from the top of the bed against the diverter means constituted by the angled bottom wall 26 of the compartment 22. This material is diverted as a substantially horizontal cascade across the top of, to fall onto, the material of bed A, whereby the solid combustible products of partial combustion and the non-combustible content of the refuse fed to bed A are caused to migrate down through bed A and to flow beneath the partition wall 4 into the lower regions of compartment 8 where combustion is completed. Thus it will be appreciated that a circulating bed system is set up around the partition wall 4.

The non-combustible content of the refuse and the solid products of combustion fall into the outlet tube 12 below the compartment 8 and can periodically be removed from the incinerator.

The primary combustion of the refuse in compartment 6 results in exhaust gases rising up the vessel 2 to the top wall 18 thereof, allowing particles taken up with said gases to fall back into the compartments. The gases then pass down tube 20 into the chamber 22 and out of the vessel through outlet duct 24. Any bed material carried over with the hot gases fallse from chamber 22 down pipe 28 and is collected outside the vessel.

The secondary combustion in compartment 8 of the char circulated from compartment 6 results in hearing of the air supplied to said compartment 8. The substantially horizontal cascade from compartment 8 to compartment 6 over the wall 4 is continuously supplied with preheated combustion air and gaseous products of combustion from the compartment 8, and thus constitutes a final burner through which the gaseous products of combustion from compartment 6 vent.

The upper regions of the vessel, and with no surging of the exhaust gases from the compartment 6 and 8, particulate matter of given physical properties, such as density, size, shape and the like, will become trapped in the freeboard below wall 18, being unable to escape upwards or downward thereform. This gives rise to a gritty, rather than dusty, atmosphere in the freeboard, whereby the exhaust gases pass through a suspensoid 'belt' and physical interaction by way of collision occurs between particulate matter carried by the gases and that matter comprising the 'belt'.

As can be seen from FIG. 2, the compartment 8 is divided into sub-compartment 8B1-4 by means of longitudinal vanes 30 extending radially between the tube 28 and the wall 4. Said sub-division, which is preferred but not essential, prevents the material of bed B from going seriously out of balance on fluidisation.

Figure 3:
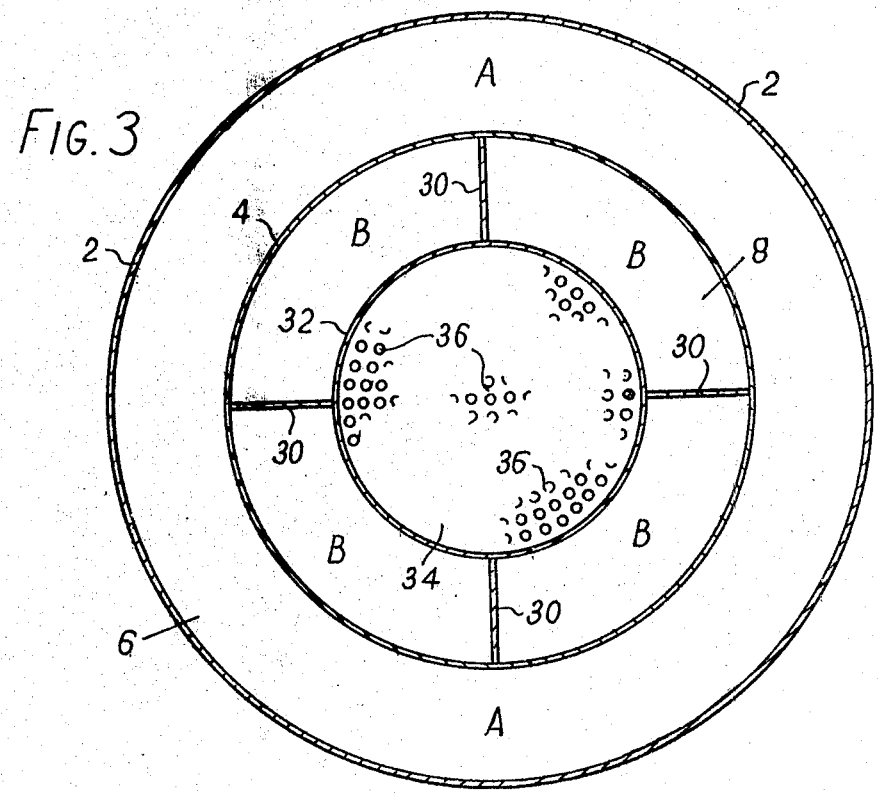
FIG. 3 is a section similar to that of FIG. 2 but through an alternative incinerator according to the invention and FIG. 4 is a vertical section through a further incinerator according to the invention.

Referring to FIG. 3, the incinerator illustrated therein permits, for example, steam raising or district heating by the heat generated in the combustion of the waste material. More particularly, a further partition wall 32, which may be omitted in certain circumstances, define a third compartment 34 in the centre of compartment 8. Said compartment 34 is in communication with compartment 8 both above and below the wall 32 and is separately fluidised to control heat exchange between the two adjacent compartments. A bundle of heat-exchanger tubes 36 is positioned in, to extend axially through, the compartment 34. Fluid circulating through said tubes is heated by the heat generated in the incinerator, and said fluid can, if desired, itself be used to control the operating temperature of bed B and, consequently, bed A.

Figure 4:
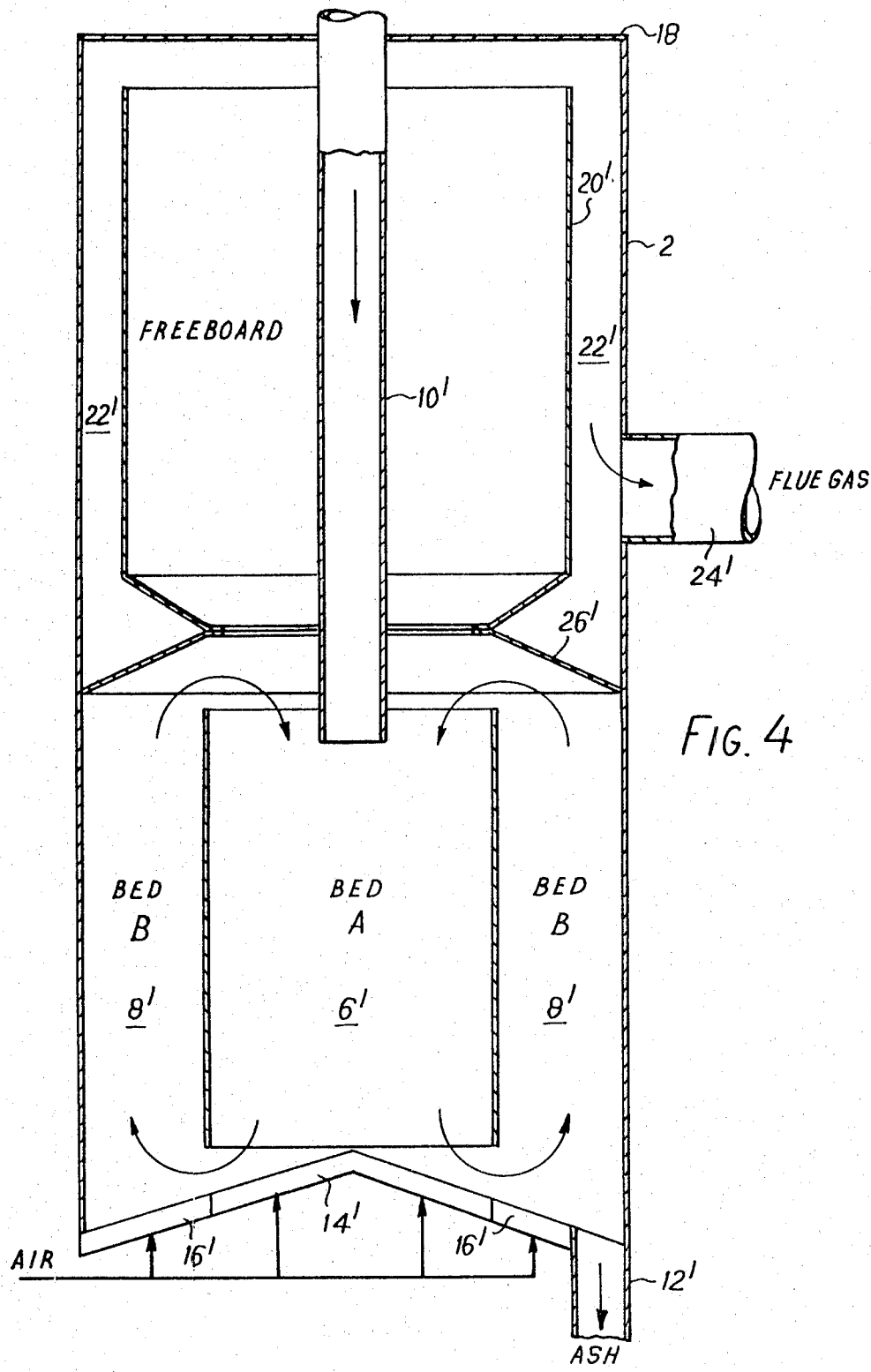
Figure 5:
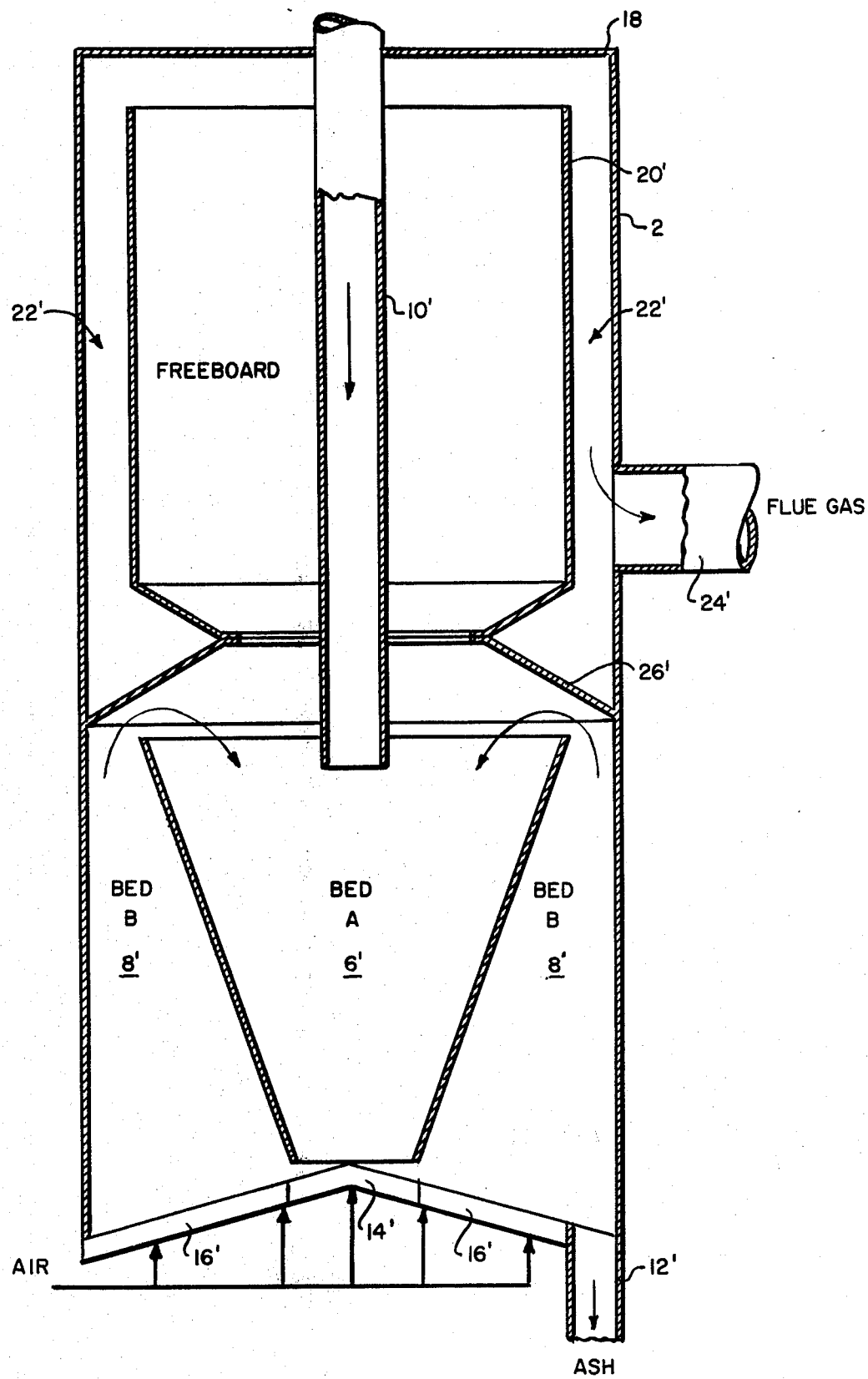
FIG. 5 is a vertical section through a further modification of an incinerator according to the invention.

Referring to FIG. 4, there is illustrated an incinerator in which the beds A and B are designed to interchange in the reverse direction from that shown in FIG. 1. The primary combustion bed A is located centrally of the vessel 2, waste material being fed thereto through a downcoming inlet tube 10' extending through the upper wall 18 axially of the upper regions of the vessel 2 to terminate in the upper regions of the central compartment containing bed A.

The base of the vessel 2 and the air boxes 14', 16' slope downwardly away from the centreline of the vessel, outlet tubes 12' being disposed adjacent the periphery of the vessel 2 below the outer compartment containing bed B.

A further downcoming pipe 20' in the upper regions of the vessel 2, together with an angled plate member 26' secured to the wall of the vessel 2 as shown, defines an annular chamber 22' between the pipe 20' and the wall of the vessel 2 with an outlet duct 24' leading therefrom. The member 26' provides the diverter means for the cascade from bed B and A, while the freeboard is the annular space between the pipe 20' and the tube 10'.

In all embodiments of the invention, the upper levels of beds A and B in the associated compartments may be altered to suit particular requirements. For example the upper surface of bed A may be below, fo example substantially below, the top of the partition wall 4 on fluidisation, whereby the particulate refractory material of bed B, which is pneumatically transported upwards against the diverter means and constitutes the substantially horizontal cascade across the top of bed A, falls down onto said bed A.

Although the partition walls 4 in the various embodiments are shown as being vertical, said walls may be angled upwards towards the top of the vessel 2, whereby the cross-sectional areas of beds A and B increase and decrease respectively towards the upper regions thereof. It will be appreciated that a single airbox in place of the boxes 14 and 16 and supplying air under the same pressure to both compartments 6, 8 will still be able to achieve the desired cascade from bed B to bed A, in that the bed material at the top of compartment 8 will be fluidised to a greater extent than that at the top of compartment 6 due to the difference in cross-sectional areas thereat.

It should also be emphasized that reactors according the invention need not be of a cylindrical configuration but may be of, for example, rectangular shape including a flat partition wall defining adjacent rectangular compartments. Further, a single reactor may incorporate a series of aligned or concentric beds such as A and B.

Although described with reference to incinerators, thermal reactors according to the invention may also be used for, for example, combustion, partial oxidation, gasification, pyrolysis (fuel being passed through a bed with provision for the take-off of products), calcining (the material to be calcined constitutes the particulates beds A and B), or catalysis (the particulate material of bed A constitutes the catalyst through which reactants are passed).

Thermal reactors according to the invention enable rapid circulation of bed material to be set up around a positive path defined by the partition wall between the two compartments. The rate of circulation, which is a consequence of the combustion rate, can readily be adjusted by altering the degree of fluidisation in bed B.

Compared with established reactors, reactors according to the invention provide a greater flexibility in operation, greater case of control and improved combustion efficiency. More particularly, the depth of the beds can be substantially increased over known arrangements, enabling residence time of the material to be reacted in both combustion beds to be increased. There are fewer and less critically adjustable fluidisation air controls, the need for secondary air is eliminated, while the cascade, because of the short 'throw' involved, can readily be established with a minimum of bed elutriation.

Further, the high rates of circulation that can be achieved in reactors according to the invention prevent stratifications of the bed material occurring as does happen in the beds of existing fluidised bed reactors. In such existing reactors, the beds are in a state of teeter, with all the small particles at the base of the bed. By preventing such stratification, reactors according to the invention can utilise bed material incorporating particles of a wider size range than in the existing arrangements.

I claim:

1. A thermal reactor comprising a furnace vessel having a vertically aligned exterior shell, an upstanding partition shell coaxially located inside the exterior shell and disposed within the lower region thereof to define within said vessel, on the opposing sides of said partition shell, first and second coaxial compartments in communication with each other adjacent both the upper and lower regions of said partition shell, an air permeable bottom wall formed in said exterior shell below said partition, said bottom wall being inclined downwardly from said first to said second compartment, a mass of particulate material forming a first bed in the first compartment, a further mass of particulate material forming a second bed in the second compartment, the upper surfaces of said first and second beds, in the static condition of the reactor, being below the level of the top of the partition shell, diverter means located at least above the second compartment and extending toward said first compartment and spaced above said partition shell to define, with the top of the partition shell, an outlet slot from the second compartment into the first compartment, means for fluidizing both said first and second beds, including means for controlling the fluidization of each of said first and second beds respectively such that the fluidization of the first bed is substantially uniform and to a lesser extent than the fluidization of the second bed, and the material in the first compartment is caused to flow generally downwardly and the upper surface thereof remains below the level of the top of the partition shell, and the material in the second compartment is caused to flow generally upwards at a velocity to impinge on said diverter means and be deflected by said diverter means through said outlet slot as a substantially horizontal cascade extending right across and falling onto, the entire area of the upper surface of the first bed, and in conjunction with said bottom wall to establish continuous circulation of material around the upstanding partition shell, at least one inlet means from the exterior of the furnace vessel for supplying material to be reacted to the upper region of said first compartment, and at least one outlet means from the second compartment for discharging non-combustible product and bed material and a flue outlet communicating with said first and second compartments for discharge of gas.

2. A thermal reactor according to claim 1 wherein said vertically aligned exterior shell is of generally cylindrical configuration.

3. A thermal reactor according to claim 1 wherein said vertically aligned exterior shell is of quadrilateral configuration.

4. A thermal reactor according to claim 1 wherein said upstanding partition shell is of generally cylindrical configuration.

5. A thermal reactor according to claim 1 wherein said upstanding partition shell is of generally quadrilateral configuration.

6. A thermal reactor according to claim 1, in which the first compartment surrounds the second compartment, the diverter means comprising an inverted conical member positioned centrally over the second compartment.

7. A thermal reactor according to claim 1, in which the vessel and partition wall are cylindrical to define within the vessel a central cylindrical compartment and a surrounding annular compartment.

8. A thermal reactor according to claim 1, in which a plurality of longitudinal vanes are located in said second compartment dividing said compartment into a plurality of longitudinal sub-compartments.

9. A thermal reactor according to claim 1, having one or more heat exchanging tubes located within the second compartment.

10. A thermal reactor according to claim 9, wherein said heat exchanging tubes are located within a third compartment formed by having a further upstanding partition shell coaxially located within the second compartment.

11. A thermal reactor according to claim 1 wherein the configuration of the partition shell defines first and second compartments, the cross sectional areas of which increase and decrease respectively from the lower regions to the upper regions thereof, a common fluidizing means being provided for both compartments.

12. A thermal reactor according to claim 11 wherein the partition shell is of generally inverted conical configuration.

13. A thermal reactor according to claim 1, in which the diverter means comprises a plate member securely mounted within the vessel to extend across the top of the second compartment.

14. A thermal reactor according to claim 13, in which said plate member is angled upwardly in a direction from the second compartment towards the first compartment.

* * * * *